United States Patent [19]

Waschkuttis

[11] 4,381,756
[45] May 3, 1983

[54] GASOLINE ECONOMIZING ATTACHMENT DEVICE FOR INTERNAL COMBUSTION ENGINES

[75] Inventor: Gerhard Waschkuttis, North Miami Beach, Fla.

[73] Assignee: Walter Mundorf, Sieburg, Fed. Rep. of Germany; a part interest

[21] Appl. No.: 202,893

[22] Filed: Oct. 31, 1980

[51] Int. Cl.³ .................................. F02M 33/02
[52] U.S. Cl. ............................. 123/591; 123/548
[58] Field of Search ............... 123/591, 548, 592, 593, 123/590, 25 B, 257

[56] References Cited

U.S. PATENT DOCUMENTS

| | | | |
|---|---|---|---|
| 2,633,836 | 4/1953 | Cox | 123/591 |
| 3,847,125 | 11/1974 | Malherbe | 123/590 |
| 4,024,849 | 5/1977 | Hoots | 123/593 |
| 4,078,532 | 3/1978 | Smith | 123/590 |

FOREIGN PATENT DOCUMENTS 1019861 11/1957 Fed. Rep. of Germany ...... 123/590

Primary Examiner—Charles J. Myhre
Assistant Examiner—E. Rollins Cross
Attorney, Agent, or Firm—Ernest H. Schmidt

[57] ABSTRACT

A device for use in association with a carburetor of the type used for supplying fuel at the intake manifold of a gasoline internal combustion engine has an annular chamber at the exit port of the carburetor, adapted to collect uncarbureted raw gasoline particles or globules for drainage through an external vaporizing system under the influence of the vacuum created at the intake manifold during operation of the engine for reintroduction as vaporized fuel at the intake manifold, thereby converting raw gasoline, otherwise wastefully fed to the engine, into efficiently combustible fuel.

4 Claims, 7 Drawing Figures

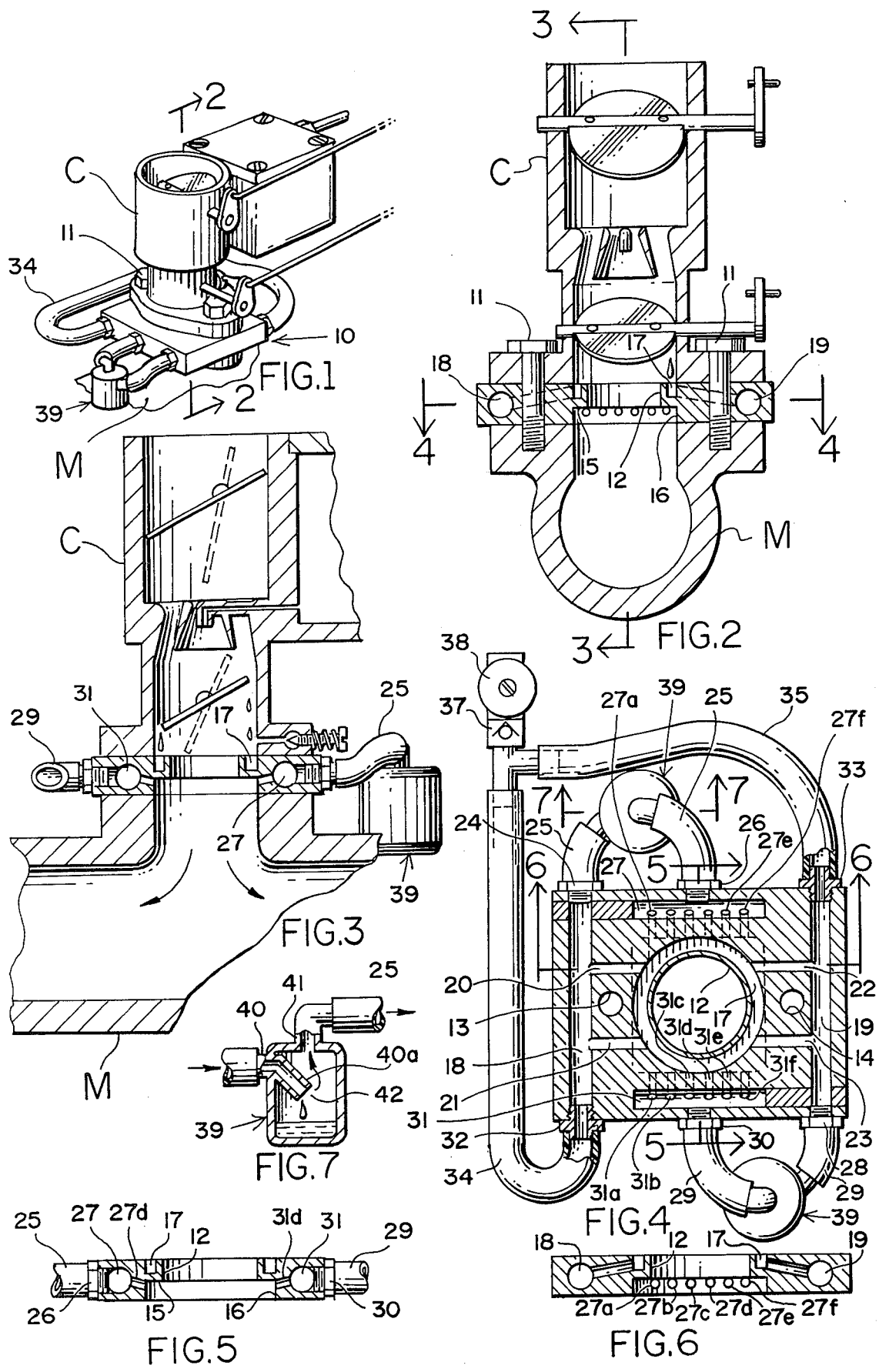

GASOLINE ECONOMIZING ATTACHMENT DEVICE FOR INTERNAL COMBUSTION ENGINES

BACKGROUND OF THE INVENTION

The use of carburetors for vaporizing liquid gasoline supplied as fuel to internal combustion engines, particularly motor vehicle engines, has been commonplace for many years. Such carburetors depend, for the most part, on the use of needle valves and the like for atomizing the raw gasoline for mixture with air drawn into intake manifold for distribution to the combustion chambers of the engine. A butterfly valve in the air flow chamber of the carburetor is mechanically linked with an accelerator pedal (in automotive vehicles) to control engine speed or acceleration. One or more adjustable idler needle valves at the carburetor are utilized to supply gasoline vapor mist sufficient for idling the engine when the accelerator is at its minimal or "off" position. One of the deficiencies of such known carburetors resides in the face that carburetion or atomization of the raw gasoline for efficient use as a gaseous fuel is often incomplete, for various reasons such as improper jet adjustment, erratic operation of the accelerator, and improper idler adjustment, for example. As a result, raw gasoline in the form of droplets or globules are drawn directly into the intake manifold without first having been converted to efficiently usable gaseous fuel. Such large particles or droplets of raw gasoline moreover, for the most part, form along the upper surface of the butterfly valve controlling acceleration, to drop from the periphery thereof, substantially at the peripheral inner surface at the exit port of the carburetor.

It is, accordingly, the principal object of this invention to recover such unvaporized droplets or globules of raw gasoline which would otherwise be drawn into intake manifold and wasted by unnecessarily and undesirably enriching the otherwise properly carbureted and vaporized gasoline, and converting such collected raw gasoline to vaporized fuel for addition to the properly carbureted gasoline vapor, thereby to achieve a more economic use of the gasoline being fed to the engine.

A more particular object of the invention is to provide a gasoline economizing attachment device for internal combustion engines which, when applied in the flow path between the exit port of a carburetor and intake port of the intake manifold of an internal combustion engine, traps unvaporized raw gasoline particles not vaporized by the carburetor for passage through an auxiliary vaporizing system controlled by the vacuum created at the intake manifold upon operation of the engine for introduction to the intake manifold as efficiently usable vaporized gasoline fuel.

Another object is to provide a gasoline economizing attachment device of the character described that is well adapted to use in kit form for installation between a carburetor and its associated intake manifold for substantially economizing on gasoline fuel usage and thereby achieving substantially increased miles-per-gallon vehicular performance.

Still other objects of the invention are to provide a gasoline economizing system of the above nature which will be simple in construction, easy to install, compact in size, inexpensive to manufacture and trouble-free in operation.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 is an oblique view of an automotive vehicle carburetor equipped with a gasoline economizing attachment device embodying the invention;

FIG. 2 is a vertical cross-sectional view taken along the plane indicated at 2—2 of FIG. 1 in the direction of the arrows, on an enlarged scale;

FIG. 3 is a vertical cross-sectional view taken along the plane indicated at 3—3 of FIG. 2, in the direction of the arrows;

FIG. 4 is a horizontal cross-sectional view taken along the plane indicated at 4—4 of FIG. 2, in the direction of the arrows;

FIG. 5 is a transverse cross-sectional view taken along the plane indicated at 5—5 of FIG. 4, in the direction of the arrows;

FIG. 6 is a transverse cross-sectional view taken along the plane indicated at 6—6 of FIG. 4 in the direction of the arrows; and FIG. 7 is a vertical cross-sectional view taken along the plane indicated at 7—7 of FIG. 4 in the direction of the arrows and illustrating details of one of the auxiliary vaporizing chambers.

Referring now in detail to the drawings, reference numeral 10 indicates, generally, a preferred form of gasoline economizing attachment device embodying the invention, shown installed as an insertion between a typical carburetor C and the associated intake manifold M (partially illustrated) of a gasoline internal combustion engine. The attachment device 10, which may conveniently be fabricated of metal, is of rectangular shape, and will preferably be no more than one inch in thickness to enable compact installation between the mounting flange of the carburetor and the intake port or throat of the engine manifold with the usual attachment bolts 11, as best illustrated in FIGS. 1 and 2. Attachment device 10 is provided with a circular through opening 12 and a pair of diametrically-opposed bolt openings 13, 14, appropriately spaced at each side of said central through opening to align with the openings through which the carburetor attachment bolts 11 extend for attachment to the engine manifold M. The attachment device 10 may be fabricated either by machining or die casting of a suitable heat-resistant metal.

As illustrated in FIGS. 2 through 6, the circular through opening 12, upon installation of the device, is concentric with the aligned outlet port of the carburetor C and intake port of the manifold M, and is of somewhat decreased diameter. It is defined by a decreased diameter portion 15 integrally formed intermediate the ends of concentric circular opening 16, said circular opening 16 having same diameter as that of the intake port of the manifold M. The decreased diameter portion 15 is formed with an annular recess 17, at its upper end, the outer diameter of which is the same as, and concentric with, the outlet port of the associated carburetor C. Thus, raw or large unvaporized globules or droplets of gasoline passing through the carburetor will, for the most part, find their way into the annular recess 17 for reprocessing and more economical use as a combustion fuel in the manner hereinafter more particularly described.

As illustrated in FIGS. 2,4 and 6, the attachment device 10 is provided with a pair of through bores 18, 19, in spaced, parallel relation and somewhat inwardly of each side. A pair of comparatively small-diameter, sidewardly-extending bores 20, 21 communicate between annular recess 17 and bore 18 at one side of the device; and a pair of sidewardly-extending bores 22, 23 communicate between annular recess 17 and bore 19 at the other side. The rearward-most end of bore 18 is fitted with a nipple 24 connecting with a length of flexible tubing 25 communicating with a nipple 26, extending into an internal, sidewardly-extending rear bore 27 at a central position therealong. Connected in series with the length of tubing 25 is an auxiliary vaporizing chamber 39, the purpose and details of which are hereinafter more particularly described with reference to FIG. 7. The forward-most end of the bore 19 is likewise fitted with a nipple 28 connecting a length of flexible tubing 29 to an internal, sidewardly-extending front bore 31 at a central position therealong through nipple 30. An auxiliary vaporizing chamber 39 is similarly connected in series with the length of flexible tubing 29. A plurality, six in the embodiment illustrated, of comparatively small-diameter, spaced, parallel bores 27a through 27f communicate between back bore 27 and concentric central opening 16, at positions immediately below decreased-diameter portion 15. Similarly, six comparatively small-diameter, spaced, parallel bores 31a through 31f communicate between front bore 31 and the concentric central opening 16, at the opposite side thereof.

The remaining outer ends of the side bores 18, 19 are fitted with connector fittings or nipples 32, 33 for the attachment of lengths of flexible tubing 34, 35 communicating with each other by means of a T-fitting 36, the remaining leg of which T-fitting is connected through check valve 37 to an air inlet valve 38.

As is best illustrated in FIG. 7, the auxiliary vaporizing chamber 39 is formed with an inlet nipple 40 extending into a downwardly-directed, interior nozzle portion 40a, said nipple being connected with its associated length of flexible tubing as described above, and a nipple 41 communicating with the upper end of the chamber for connection with the same series-connected length of tubing. As further illustrated in FIG. 7, excess liquid gasoline not vaporized by air passage through the input length of flexible tubing, drops to bottom of the chamber whereat, during periods of reduced inflow of liquid gasoline, its vaporization for further efficient use as a combustion fuel is induced by the air stream jet directed down against the fluid gasoline surface by the interior nozzle portion 40a.

In operation, manual opening of the valve 38 permits air to be drawn into the bores 18, 19 for admixture with the raw or fluid gasoline flowing through small-diameter bores 20, 21, 22 and 23, for discharge, upon conversion to gasoline vapor, into the inlet opening of the associated manifold M through multiple small diameter bores 27a through 27f, and 31a through 31f, under the influence of the vacuum created within the intake manifold during operation of the engine. Thus, as illustrated in FIG. 3, droplets or globules of uncarbureted gasoline which would otherwise flow directly into the intake manifold, resulting in wasteful fuel consumption such as occurs not only during "flooding" of the engine during cold starts, but also during periods of acceleration. Such fuel wastage is minimized with use of the present invention by reason of the capture for vaporization and reuse of the raw gasoline directed into the annular recess 17. In this connection, it will be understood that the carburetor butterfly valve controlling acceleration serves to direct excess liquid gasoline by gravity passage downwardly of its outer periphery and into the annular recess 17. As described above, the vacuum developed by operation of the engine and applied at the manifold ends of bores 27a through 27f and 31a through 31f induces a flow of air through air inlet valve 38 and check valve 37, over the excess raw gas passing through bores 18, 19, through the flexible lengths of tubing 25 and 29 and their series-connected auxiliary vaporizing chambers 39. During this air passage, the recovered liquid gasoline is vaporized for efficient use in engine combustion, thereby substantially increasing miles-per-gallon engine performance. It is further to be noted that the economizing attachment device comprising the invention also serves to capture excess raw gasoline otherwise wastefully supplied to the intake manifold due to incorrect carburetor adjustments, such as improper adjustment of the idler and needle valves.

While I have illustrated and described herein only one form in which my invention can conveniently be embodied in practice, it is to be understood that this embodiment is presented by way of example only, and not in a limiting sense. For example, although the invention is described and illustrated as an attachment device, it could as well be incorporated as an integral part of an original carburetor, thereby substantially increasing carburetion efficiency with consequent increase in miles-per-gallon gasoline engine performance.

What I claim as new and desire to secure by Letters Patent is:

1. A gasoline economizing attachment device for internal combustion engines comprising, in combination, a substantially flat housing member adapted for insertion between the exit port of a gasoline carburetor and the intake port of the intake manifold of a gasoline combustion engine, said housing member having a central through opening for coaxial connection between the carburetor and the intake manifold for carbureted fuel flow therethrough, a raw gasoline collection recess about the inner periphery of said housing through opening, flow path communicating means between said annular recess and a plurality of openings below said annular recess, said flow path communicating means comprising a first plurality of bores in said housing and communicating between said annular recess and a through bore in said housing, a second plurality of bores opening at one end into said central housing through opening below said annular housing recess, said flow path communicating means further including an external length of tubing communicating between one end of said through bore and the inner ends of said second plurality of bores, said flow path communicating means further comprising a vaporizing chamber in said external length of tubing adapted to collect excess raw gasoline, and a nozzle within said vaporizing chamber directing a stream of the vacuum-moved air against the surface of said excess collected raw gasoline for inducing the vaporization thereof in said flow path communicating means, and means controlling the volume of air being drawn into said through bore at the other end thereof under the influence of vacuum applied at said central through opening in said housing member during the operation of the internal combustion engine, whereby raw gasoline collected in said annular recess will be admixed with air in said flow path communicating means for the vaporization thereof and reintroduction as gaseous fuel through said plurality of openings.

2. A gasoline economizing attachment device as defined in claim 1, wherein said air volume control means comprises a manually controlable valve.

3. A gasoline economizing attachment device as defined in claim 2, including a check valve connected series with said manually controlable valve to inhibit the reverse flow of gaseous fluid therethrough.

4. A gasoline economizing attachment device as defined in claim 1, comprising a third plurality of bores in said housing communicating between said annular recess and a second through bore in said housing, a fourth plurality of bores opening at one end into said central housing through opening below said housing annular recess, said flow path communicating means further including a second external length of tubing communicating between one end of said second through bore and the inner ends of said fourth plurality of bores, and means controlling the volume of air being drawn into said second through bore at the other end thereof under the influence of vacuum applied at said central through opening of said housing member during operation of the internal combustion engine.

* * * * *